United States Patent [19]

Cable et al.

[11] 3,985,495

[45] *Oct. 12, 1976

[54] METHOD AND APPARATUS FOR FAST FIRING GLAZED CERAMIC TILE TRIM PIECES

[75] Inventors: John A. Cable; Stephen J. Cable; Richard R. Falbo, all of Canton, Ohio

[73] Assignee: United States Ceramic Tile Company, Canton, Ohio

[ * ] Notice: The portion of the term of this patent subsequent to Mar. 20, 1992, has been disclaimed.

[22] Filed: May 12, 1975

[21] Appl. No.: 576,719

Related U.S. Application Data

[62] Division of Ser. No. 464,471, April 26, 1974, Pat. No. 3,884,619.

[52] U.S. Cl. .................................................... 432/2
[51] Int. Cl.² ........................................... F27B 9/30
[58] Field of Search ............. 432/1, 2, 5; 15/DIG. 7

[56] References Cited
UNITED STATES PATENTS

| | | | |
|---|---|---|---|
| 1,144,066 | 6/1915 | Roitzheim | 432/2 |
| 3,471,135 | 10/1969 | Cremer | 432/5 |
| 3,884,619 | 5/1975 | Cable et al. | 432/2 |

*Primary Examiner*—John J. Camby
*Attorney, Agent, or Firm*—Gardiner, Sixbey, Bradford & Carlson

[57] ABSTRACT

The method and apparatus for fast firing glazed ceramic tile trim pieces includes passing the trim pieces through a firing chamber by means of ceramic rollers which are designed to move the trim pieces in substantially a straight line through the chamber. The rollers include trim piece supporting surfaces which are inclined relative to a horizontal plane to cause gravitational forces to maintain the trim pieces against aligned orienting stops. Deposited glaze is removed from the rollers by periodically increasing the firing chamber temperature to a point where the glaze will release from the supporting roller and redeposit on a porous refractory passed over the roller.

5 Claims, 6 Drawing Figures

METHOD AND APPARATUS FOR FAST FIRING GLAZED CERAMIC TILE TRIM PIECES

This is a division, of application Ser. No. 464,471, filed Apr. 26, 1974, now U.S. Pat. No. 3,884,619.

BACKGROUND OF THE INVENTION

The production of glazed ceramic tile in accordance with conventional processes requires a period of up to five days from the time the tile is pressed into shape until the final glazed tile product is complete and ready for use. The recent development of improved roller type kilns such as that disclosed in U.S. Pat. No. 3,608,876 to Charles E. Leaich et al, coupled with new techniques in the forming process for ceramic tile have reduced the processing time involved in the formation of glazed ceramic tile from periods of four or five days to a matter of hours; and in some instances less than two hours. Such fast firing processes involving roller kilns of a type similar to that disclosed by the Leaich et al patent involve the continuous passage of a large number of individual ceramic tile over the ceramic hearth rollers of the roller kiln to accomplish a continuous firing process as the tile passes through the kiln. To produce an acceptable glazed ceramic tile product, it is imperative that the firing of the tile be achieved under closely controlled conditions within the kiln, and during passage through the kiln, the tile must be subjected to a number of controlled temperatures for very specific periods of time. To effectively accomplish this firing process, not only must the differing temperature zones throughout the kiln be accurately regulated, but also the tracking of continuous stream of individual ceramic tile across the hearth rollers of the kiln must be closely controlled to achieve the desired firing times for all individual tiles passing through the kiln. Only by providing temperatures and firing times which are substantially uniform for all tiles in the constant stream of tile passing through the kiln will an acceptable and uniform tile product be produced.

Effective fast firing processes for the production of conventional flat surfaced, glazed ceramic tile have been developed and are in use, and such tile constitute 80 to 90% of the tile produced. However, it is still necessary to employ slow firing processes involving a plurality of days to produce ceramic tile trim pieces which constitute the remaining 10 to 20% of the tile sold. These trim pieces come in innumerable geometrical shapes and sizes, and heretofore it has been virtually impossible to accurately track a plurality of such trim pieces through a fast fire roller kiln. While substantially flat surfaced glazed ceramic tile may be maintained in substantially parallel tracks as the tile moves through a fast fire roller kiln so that all tile are subjected to carefully controlled firing times in the different temperature zones of the kiln, the irregular shape of ceramic trim pieces causes these trim pieces to follow irregular paths across the rollers of the kiln. Thus it has been impossible to maintain constant firing times for all trim pieces as they move through various temperature zones within the kiln, for the trim pieces, unlike flat surfaced ceramic tile, refuse to follow a determined path and move in controlled streams. Also, in the fast firing of trim pieces, the deposited glaze on the ceramic rollers of the kiln in certain kiln sections may become even more of a problem than do similar deposits occurring during the fast firing of conventional flat surfaced ceramic tile.

It is the primary object of the present invention to provide a novel method and apparatus for fast firing glazed ceramic tile trim pieces in a roller kiln.

Another object of the present invention is to provide a novel method and apparatus for maintaining glazed ceramic tile trim pieces of irregular geometrical configurations in controlled parallel streams during movement thereof through a roller kiln.

A further object of the present invention is to provide a novel method for fast firing glazed ceramic tile which involves the effective removal of glaze and other foreign deposits from the ceramic rollers of a roller kiln.

Another object of the present invention is to provide a novel kiln roller construction adapted to provide controlled tracking for a plurality of glazed ceramic trim pieces through a roller kiln.

A still further object of the present invention is to provide a novel method and apparatus for producing ceramic tile trim pieces by a fast firing process in a roller kiln while accurately maintaining uniform firing times and temperatures for a plurality of trim pieces moving in a stream through various temperature zones of the kiln.

These and other objects of the present invention will become readily apparent upon a consideration of the following specification and claims taken in conjunction with the accompanying drawings in which:

Figure 1:
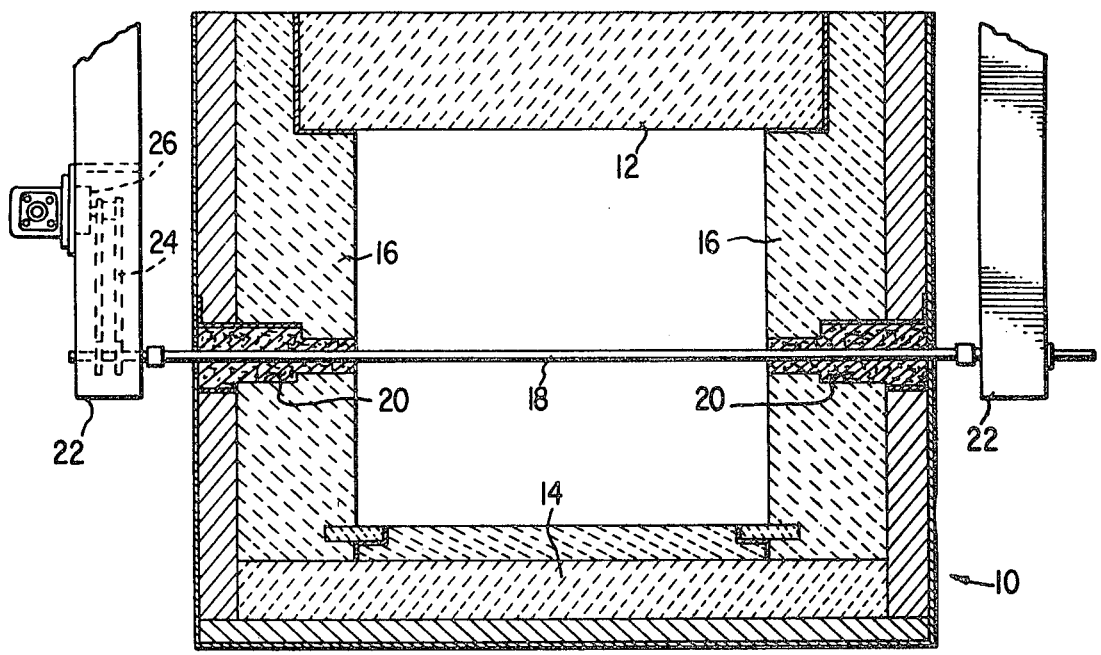
FIG. 1 is a cross sectional view showing a firing chamber for a roller kiln provided with conventional ceramic rollers.

The kiln ceramic roller construction of the present invention will be employed in the firing chamber of a roller type kiln; the firing chamber indicated generally at 10 in FIG. 1 being illustrative of such use. This firing chamber is an elongated, open ended, firing chamber for a roller hearth kiln defined by a top wall 12, a bottom wall 14, and side walls 16 of refractory material. The ceramic pieces to be fired are conveyed from the entrance end through the firing chamber to the exit end by ceramic rollers 18 rotatably mounted to span the chamber between the side walls 16. A plurality of these ceramic rollers are mounted in side by side relationship to provide a conveying path through the firing chamber 10.

Generally, each ceramic roller 18 extends through apertures 20 in the side walls of the firing chamber which are packed with insulating material. The outer ends of each ceramic roller are mounted for rotation upon external support structures 22. These external support structures include a drive train 24 to provide positive driving power to each ceramic roller 18 from a motor or other suitable drive source 26. The rollers must all be positively driven so that the speed at which such rollers transport ceramic pieces through the firing chamber 10 can be closely controlled.

As previously indicated, uniform surfaced rollers of the type illustrated at 18 in FIG. 1 may be employed effectively to convey flat surfaced ceramic tile through the firing chamber during a fast firing process. A plurality of flat surfaced tile arranged in rows across the rollers 18 will track in a relatively straight line through the firing chamber, so that a substantially uniform firing time for each tile will be maintained from the time that the tile enters the entrance end of the firing chamber until the time that the tile exits from the outlet and thereof. This tracking of the tile in a relatively straight line parallel to the side walls 16 will not occur if irregularly shaped ceramic tile trim pieces are introduced into the firing chamber 10 on the rollers 18. The weight distribution of such trim pieces is irregular due to the varied configuration thereof, and therefore, when conveyed by uniform surfaced rollers, such trim pieces deviate from a straight line path.

Figure 2:
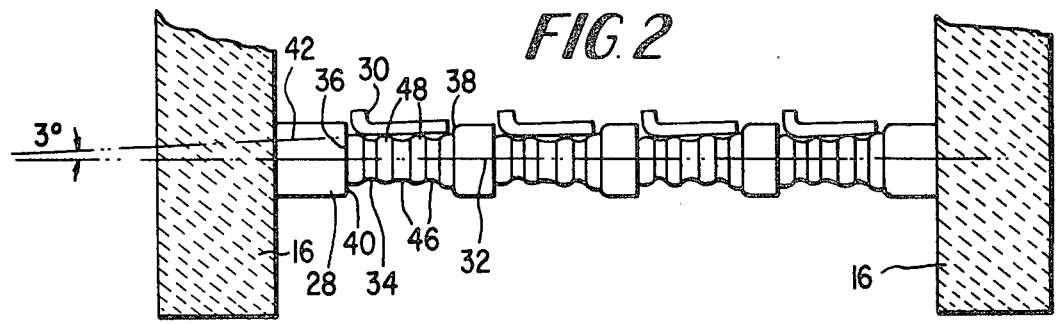
FIG. 2 is a view in side elevation of a ceramic roller of the present invention.

In FIG. 2, a novel roller 28 is illustrated which is adapted to replace the rollers 18 and which is also designed to maintain ceramic trim pieces 30 in a controlled, straight line path as they are conveyed through the firing chamber 10. The roller 28 is mounted in a conventional manner between the walls 16 of the firing chamber and rotates about a central longitudinal axis 32 which is substantially perpendicular to the side walls of firing chamber. The surface of the roller is provided with a plurality of longitudinally spaced cutaway sections 34 which are adapted to define a support surface for a trim piece 30. The diameter of the roller within the confines of each cutaway section gradually increases from a minimum diameter at one end 36 of the cutaway section to the opposite end 38 thereof. This results in the formation of a trim piece orienting shoulder or stop 40 at the small diameter end of each cutaway section 34.

Figure 3:
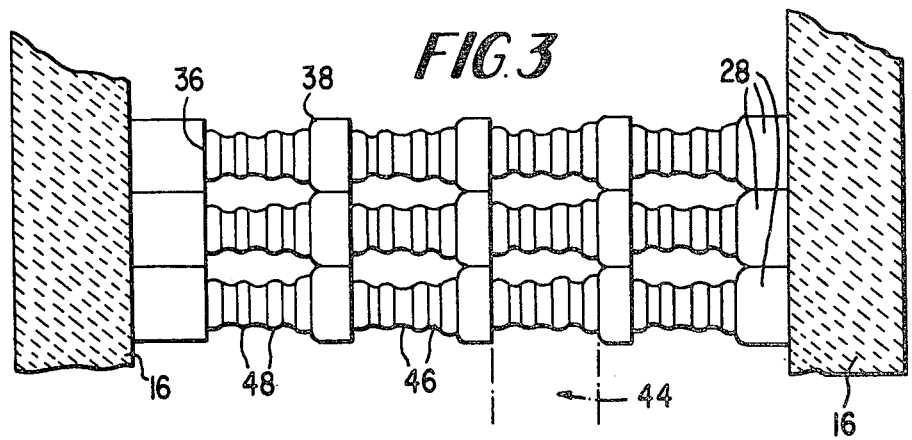
FIG. 3 is a plan view disclosing a plurality of the rollers of FIG. 2 mounted in a firing chamber.

As the diameter of the roller 28 within each cutaway section 34 increases from end to end, an inclined support surface for the trim piece is provided which extends upwardly at an angle away from the shoulder 40. In FIG. 2, a dotted line 42 indicates the plane of this support surface which is inclined to provide an angle of preferably no more than ten degrees with respect to the horizontal. This angle is sufficient to cause gravitational forces to maintain the trim piece against the orienting shoulder 40 of each ceramic roller employed in conveying the trim piece through the firing chamber 10. As will be noted from FIG. 3, the rollers are arranged within the firing chamber so that the orienting shoulders thereof are aligned to form channels extending substantially parallel to the side walls 16 of the chamber. These channels, indicated generally at 44, cause the trim pieces to track in a straight line through the firing chamber so that uniform firing thereof is accomplished. These rollers are concentric rollers and are formed and mounted to preserve concentricity.

The incline of the support surface for each trim piece within the channel is sufficient to maintain the trim piece in the channel, but is not so pronounced that the preference characteristics of the roller are adversely affected. An inclined support surface having an incline of greater than ten degrees is likely to result in weakening of the roller, greater susceptibility to thermal shock or other undesirable roller characteristics.

For some trim pieces it is desirable to minimize the contact between the surface of the trim piece and the surface of the roller 28 during the firing process. To accomplish this, the roller is further indented within the cutaway sections 34 at spaced portions 46 to provide raised support lands 48 which contact the trim piece. These raised support lands increase in diameter from the end 36 of the cutaway section to the opposite end 38 to provide the properly inclined support surface. The surface of the roller within the channel forming cutaway sections thereof may be indented in any desired manner to conform with trim pieces of various shapes and to provide the best glazed surfaces during the firing process. Although the rollers may be formed to any dimension, it has been found that ceramic rollers having an overall outside diameter of one inch and an inside diameter of ½ inch may be effectively employed. With a roller of this dimension, the cutaway sections 34 may be formed to a depth of approximately one eighth inch at the orienting shoulder 40, and this configuration provides channels 44 of sufficient depth to control the movement of the trip pieces through the firing chamber. The roller 28 may be economically fabricated by turning a ceramic roller on a lathe after it is bisqued fired and then subsequently high firing the completed roller. One major advantage provided by the roller 28 is that the diameter thereof at the outermost surface is uniform through the roller length, so that such rollers may be easily inserted through apertures 20 in the wall of conventional firing chambers to replace conventional uniform surfaced rollers 18. No modification is required in conventional firing chamber structures to receive the rollers 28.

Figure 4:
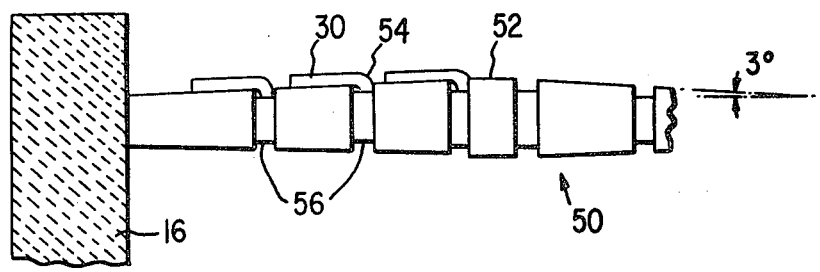
FIG. 4 is a view in side elevation of a ceramic roller constructed in accordance with a second embodiment of the present invention.

FIG. 4 discloses a crowned ceramic roller construction indicated generally at 50. In this construction, the roller tapers at an angle of preferably no more than ten degrees relative to the horizontal from the side walls 16 of the firing chamber to a center point 52 of maximum diameter. When trim pieces 30 having downwardly projecting portions 54 are conveyed through the firing chamber, the crowned roller may be provided with grooves 56 to receive the downwardly extending portions of the pieces. These grooves operate as orienting shoulders to maintain the trim pieces in line as they pass through the firing chamber, and the inclined surface of the roller causes gravitational forces to maintain the downwardly projecting portions 54 of the trim strips in contact with one side of the grooves 56. The grooves of adjacent rollers in the firing chamber are aligned to cause the trim pieces to be conveyed in a straight line. Obviously, if the roller 50 is to be designed to convey trim pieces of shapes other than those illustrated in FIG. 4, the grooves 56 may be eliminated and replaced by outwardly projecting stops of the type disclosed in FIG. 5.

Figure 5:
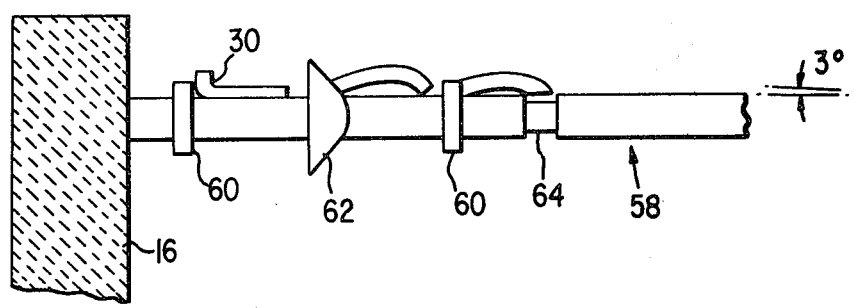
FIG. 5 is a view in side elevation of a ceramic roller constructed in accordance with a third embodiment of the present invention.

A roller 58 having a uniform outer diameter is illustrated in FIG. 5, and this roller is angularly disposed between the side walls 16 of the firing chamber. The roller is inclined upwardly at an angle of no more than ten degrees from the horizontal so that trim pieces 30 conveyed thereby may be maintained by gravitational force against outwardly projecting stops formed on the roller. These stops may take various forms which conform to the particular trim pieces being fired, and, as illustrated, might include circular stops 60 formed upon the roller or an inclined collar 62. In many instances it is desirable to avoid contact between a portion of the surface of a particular trim piece and the conveying roller, and for this purpose, the roller may be suitably cut away as at 64 so that no contact occurs between this roller portion and a designated section of the trim piece surface.

Once the glaze material has been applied to a tile piece during the formation of glazed ceramic tile by a fast firing process, glaze subsequently tends to deposit upon the ceramic rollers within the firing chambers employed in the process. This deposit of glaze occurs on conventional ceramic rollers 18 as illustrated in FIG. 1, but the deposit sometimes becomes more pronounced on rollers of irregular configuration such as those disclosed in FIGS. 2–5. This glaze deposit varies in consistency in dependence upon the particular temperature zone within the firing chamber where the deposit occurs. For example, in some zones of the firing chamber, the deposited glaze is of a dustlike consistency and therefore does not adhere to the ceramic conveying rollers. As the temperature of the firing chamber increases, the glaze material becomes molten and increases in viscosity to form an adherent deposit having a consistency comparable to pulled taffy. A deposit of this consistency occurs at an inner zone forming about 30% of the firing chamber, and this deposit adheres to the ceramic rollers causing a build-up which increases the diameter of the rollers and diverts the conveyed tile from the desired straight line path. However, if the temperature of this adhering glaze deposit is raised, the deposit becomes of lower molten viscosity and it has been found that this facilitates removal of the deposit from the supporting roller by the novel method of this invention.

Figure 6:
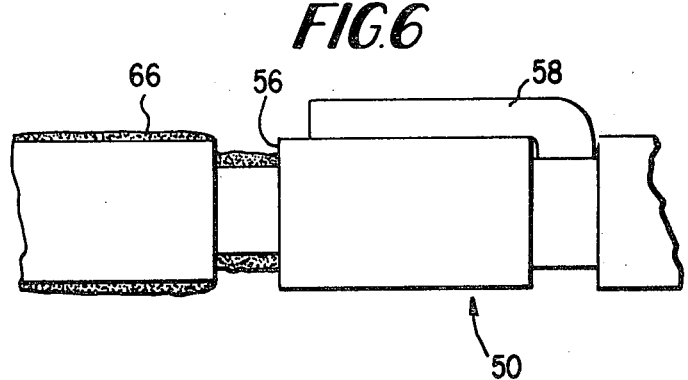
FIG. 6 is an elevational view of a section of the roller surface of the roller of FIG. 4.

With reference to FIG. 6, a section of the surface of the ceramic roller of FIG. 4 is disclosed bearing a glaze deposit 66. For this glaze deposit to adhere to the ceramic roller in the manner disclosed, this particular ceramic roller would be positioned in the interior of the firing chamber 10 within a temperature zone at which the viscosity of the glaze is increased to the point where the glaze adheres to the ceramic roller. To remove this glaze in accordance with the method of the present invention, the temperature of the zone where glaze deposit occurs is increased to a point where the deposited glaze will adhere to a porous, uncoated, refractory material. For example, such refractory material may constitute hard insulating brick, cordierite refractory having a 14 or 15% absorption characteristic, or similar refractories. These refractories are preferably formed to the shape of the tile trim pieces normally passed through the firing chamber as illustrated by the refractory 58 in FIG. 6. This refractory material is passed through the firing chamber after the chamber has been heated to a point where the adherence of the glaze to the roller is diminished in the zone where glaze deposits have occurred. The rise in temperature necessary to reduce the adherence of the glaze to the roller should be within the range of from 50° to 350° F higher than the normal operating temperature of the zone in the kiln where the glaze deposit occurs. Thus, if the normal operating temperature of the affected zone is 2100° F during the fast firing process, the temperature should be raised within the range of from 2150° to 2450° F for glaze removal. Should this range be exceeded, damage to the kiln structure is likely to result.

Once the temperature within the zone containing glaze deposits is raised, the passage of uncoated refractory through this zone causes the deposited glaze to release from the ceramic roller and to redeposit upon the refractory, thereby cleaning the roller without requiring the firing chamber to be shut down and cooled. This cleaning method may be accomplished with minimal interruption in the normal tile processing sequence being accomplished by an affected firing chamber, for the temperature of the firing chamber in the affected zone is merely increased and refractory material is then fed to the firing chamber. Once the deposit is removed from the rollers of the firing chamber, the temperature of the firing chamber is permitted to return to normal tile processing temperature in the affected zone, and the processing of glazed tile may then be reinitiated.

It is important to use a cleaning refractory such as cordierite which has a low thermal expansion and therefore can withstand the thermal shock that occurs as the cleaning refractory is run through the kiln under increased kiln temperatures. Since this refractory is passed over the kiln rollers and subjected to rather extreme temperature conditions within the kiln and is then passed immediately from the kiln into a low temperature environment, the thermal shock would destroy a refractory having a high thermal expansion characteristic. In addition to cordierite, other refractories with high thermal shock resistance may be employed. Petalite, a lithia refractory, is a material which has practically no thermal expansion, and can therefore withstand the thermal shock when used as a large refractory shape or slab form for kiln roller cleaning. A 10 to 50% burn-out or porous lithia refractory is excellent for performing the cleaning method of this invention. In addition to cordierite and petalite, mullite refractory is another ceramic material with low thermal expansion which may be used.

The mass refractories and method used to clean the shaped ceramic roller 50 of FIG. 6 are also used to clean the conventional rollers 18 of FIG. 1. Although these rollers are normally formed of ceramic material, they may also be formed of stainless steel or other metals adapted for use in the environment of the kiln. All such rollers may be cleaned by the cleaning method of this invention, but for conventional rollers, the cleaning refractory shapes differ from the refractory shapes used to clean the rollers of FIGS. 2–5. For conventional rollers, the refractory shapes are ideally large, heavy slabs of disc like form with rounded edges. These slabs or discs may be circular, cylindrical or of oval shape and the size thereof may vary with kiln size. As an example, each disc may be one to two inches thick and ten to fourteen inches in diameter. The rounded edges of the discs present no corners which can be turned and jammed together in the kiln in the manner which may occur with square or rectangular discs.

Since the glaze deposited in the higher temperature zones of the kiln is of a sticky, gumlike consistency even after the kiln temperature has been raised for cleaning, the cleaning refractory discs used for the conventional rollers of FIG. 1 encounter the most resistance where the glaze deposits are the greatest. The heavy refractory discs, which are both larger and much heavier than the tile normally processed in the kiln, push down the viscous glaze deposits to provide a blotting action. As the glaze is absorbed by the refractory, this causes the refractory to pull the glaze deposits from the rollers as the refractory moves through the kiln. The rounded refractory discs spin and twist which aids in pulling the glaze deposits free.

In some cooler sections of the kiln, particularly at the entrance or throat of the kiln, impacted dust deposits build up to form a hard deposit on the rollers. This deposit, which often forms at the ends of the rollers adjacent the walls of the kiln, is not viscous and therefore cannot be removed by the blotting and pulling action of the cleaning refractory. However, the same cleaning refractory may be used to remove these impacted dust deposits by a grinding rather than a blotting action. To accomplish this, the refractory is fed into the kiln section where the impacted dust deposits are present and then retained in place by hooks or other means while the positively driven kiln rollers turn beneath the stationary refractory. As soon as the refractory grinds the dust deposits from the rollers, it may be permitted to pass on through the kiln. As this same refractory passes through the innermost sections of the kiln, it may be employed to pull viscous glaze deposits from the rollers in the manner previously described.

We claim:

1. A method for producing glazed ceramic pieces in a heated firing chamber having conveying means for conveying said pieces through the heated firing chamber which includes supplying ceramic pieces with a coating of glaze material to said conveying means, heating said coated ceramic pieces being conveyed through said heating chamber at firing temperatures required in a firing process for said glazed ceramic pieces, replacing the glaze coated ceramic pieces supplied to said conveying means with non-glaze coated absorbent cleaning refractory shapes having a low thermal expansion characteristic and a high absorption characteristic, and causing glaze deposits on said conveying means to transfer to said absorbent cleaning refractory shapes during passage of said refractory shapes by said conveying means through the heated firing chamber.

2. The method of claim 1 which includes raising the temperature of said heated firing chamber to a temperature which is higher than the firing temperatures required by the firing process for firing the glazed ceramic pieces to decrease the molten viscosity of glaze deposits on said conveying means and subsequently introducing said absorbent refractory material onto said conveying means to cause the glaze deposits to transfer from said conveying means to said absorbent refractory material.

3. The method of claim 2 which includes decreasing the temperature of said firing chamber to the temperatures required by the firing process for firing the glazed ceramic pieces subsequent to the passage of said absorbent refractory shapes through the firing chamber, and reintroducing a supply of ceramic pieces with a coating of glaze material to the conveying means once the temperatures within said firing chamber have been lowered to the temperatures of said firing process.

4. The method of claim 3 which includes causing said coated ceramic pieces to move in substantially a straight line through said firing chamber.

5. The method of claim 3 wherein said conveying means constitute power driven rollers and which includes temporarily restraining the refractory shapes within the heated firing chamber against movement through the firing chamber while driving the rollers beneath the restrained refractory shapes to cause the restrained refractory shapes to grind away deposits on the surface of the underlying driven rollers and subsequently releasing the refractory shapes to permit movement thereof through the remainder of the kiln.

* * * * *